Patented July 5, 1927.

1,634,338

UNITED STATES PATENT OFFICE.

JAMES B. PIERCE, JR., OF CHARLESTON, WEST VIRGINIA.

PROCESS OF MAKING PRECIPITATED BARIUM CARBONATE AND BARIUM SULPHYDRATE.

No Drawing.   Application filed November 18, 1924.   Serial No. 750,676.

This invention relates to the production of barium carbonate and barium sulphydrate and has for its principal objects the efficient and economical production of such compounds from raw materials which are readily obtainable.

In carrying out my improved method, I preferably proceed as follows:

Substantially pure carbon dioxide gas, free from oxygen or other impurities capable of reacting with barium sulphide, is caused to pass into a solution of hot barium sulphide liquor maintained at a temperature preferably between 60° C. and 90° C. of 16% to 22% of barium sulphide content, which latter is preferably prepared by leaching crude barium sulphide ash with water. The passage of the carbon dioxide gas into said barium sulphide liquor is continued until substantially one-half of the barium, originally present as barium sulphide, is converted into barium carbonate and the other half of the barium originally present as barium sulphide is converted into barium sulphydrate in accordance with the following equations:

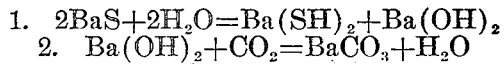

Upon the completion of the above reaction, the barium carbonate is allowed to settle and the top liquor of barium sulphydrate is drawn off. The said barium carbonate is then washed by decantation, filter pressed and dried, the same resulting in a product of the exceptional purity testing some 99% barium carbonate and being substantially free from alkalies oxidized sulphur compounds and other impurities usually present in barium carbonate.

If the passage of the carbon dioxide gas were continuued for a sufficient length of time to substantially decompose the barium sulphydrate, such second stage of the reaction would be represented by the following equation:

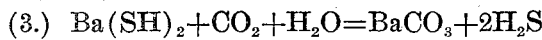

The barium sulphide liquor such as the foregoing where the same is obtained from leaching crude barium sulphide ash almost invariably contains appreciable amounts of barium thiosulphate, sulphide and other oxy-sulphur compounds, which compounds I have discovered are only decomposed by carbon dioxide when the above described reaction has proceeded beyond the first stage above referred and well into the second stage as represented by the foregoing equation (3).

I have discovered that the interruption of such reaction will not only prevent the contamination of the barium carbonate with free sulphur and sulphur compounds of barium, due to the interaction of the sulphur compounds of barium and carbon dioxide, but furthermore, that there is no substantial evolution of $H_2S$ when the reaction is so interrupted. Accordingly, in lieu of continuing the passage of carbon dioxide into the barium sulphydrate after the removal of the barium carbonate, I concentrate such barium sulphydrate and market it, as such, or employ the same for the manufacture of other compounds, such as barium sulphate in the manner described in my co-pending application No. 750,677 filed of even date herewith.

Having thus described my invention, what I claim and desire to obtain by United State Letters Patent is:

1. The method of making highly pure barium carbonate which consists in causing substantially pure carbon dioxide to react upon barium sulphide liquor while inhibiting the decomposition of the oxy-sulphur compound of barium normally present in the barium sulphide liquor by preserving approximately one-half of the barium content of the original barium sulphide liquor in the form of barium sulphydrate throughout the course of the reaction and then separating the resultant barium sulphydrate from the barium carbonate so obtained.

2. The method of making substantially pure barium carbonate free from free sulphur and oxy-sulphur compounds of barium and fixed alkali compounds which consists in causing substantially. pure carbon dioxide to react with a relatively strong hot solution of barium sulphide and interrupting the reaction after substantially half of the original barium content of the barium sulphide solution has been converted into precipitated barium carbonate and prior to the substantial decomposition of barium sulphydrate produced by such reaction into hydrogen sulphide, and then separating the resultant barium sulphydrate from the precipitated barium carbonate removing soluble impurities from such precipitated barium carbonate.

2. The method of making highly pure barium carbonate substantially free from free sulphur and sulphur compounds of barium which consists in causing carbon dioxide, which is substantially pure and free from oxygen and other impurities capable of reacting with barium sulphide, to react with barium sulphide liquor, containing substantially an equimolecular ratio of barium sulphydrate and barium hydrate respectively, while maintaining the mixture at an elevated temperature and separating the resultant barium sulphydrate from the mixture so as to preclude substantially the secondary decomposition thereof by carbon dioxide with substantial evolution of hydrogen sulphide.

Signed at Charleston, in the county of Kanawha and State of West Virginia, this 14th day of November 1924.

JAMES B. PIERCE, Jr.